Jan. 21, 1930.  I. S. LANK  1,744,231
WOODWORKING MACHINE
Filed Aug. 13, 1927   5 Sheets-Sheet 4

Inventor:
Isaiah S. Lank

Witness: Jas. L. Hutchinson

By Bollinger + Block Attorneys

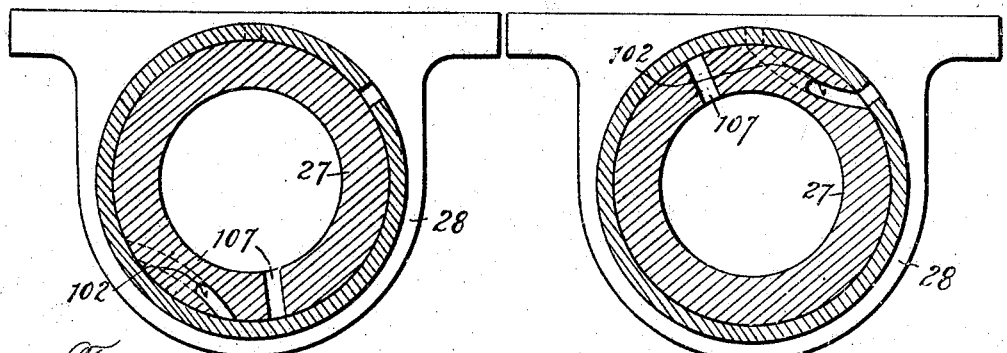

Patented Jan. 21, 1930

1,744,231

UNITED STATES PATENT OFFICE

ISAIAH S. LANK, OF DAVENPORT, IOWA

WOODWORKING MACHINE

Application filed August 13, 1927. Serial No. 212,756.

My invention relates to new and useful improvements in machines where the operations to be performed are of an intermittent nature and more particularly to a machine for cutting grooves and boring the side members in wooden window sashes adapted to carry the sash cord, the primary object of the invention residing in the provision of a machine of the character described wherein the material is automatically fed in position to be operated upon by the grooving and boring members.

Another object of the invention consists in the provision of an endless table or conveyor which carries vises for clamping the material, means being provided for automatically closing the vises to clamp the material and to automatically open the vises to release the material.

A further object resides in the provision of novel means for positioning the grooving and boring members relative to the material and operating the same, the material being moved successively to the members and held relative thereto a sufficient length of time until each member completes its operation upon the material.

With the above and other objects in view, which will appear as the description proceeds, my invention consists in the novel details of construction and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:

Figs. 6, 7 and 8 are details showing transverse sections through the valve for controlling the air supply with the valve, in each instance, shown in a different position for operation.

Fig. 9 is a detail showing in side elevation the drive gears for the endless conveyor or table and air valve.

Fig. 10 is a top plan of the material after being grooved and bored; and

Fig. 11 is a side elevation showing the material after being grooved and bored.

Figure 1:
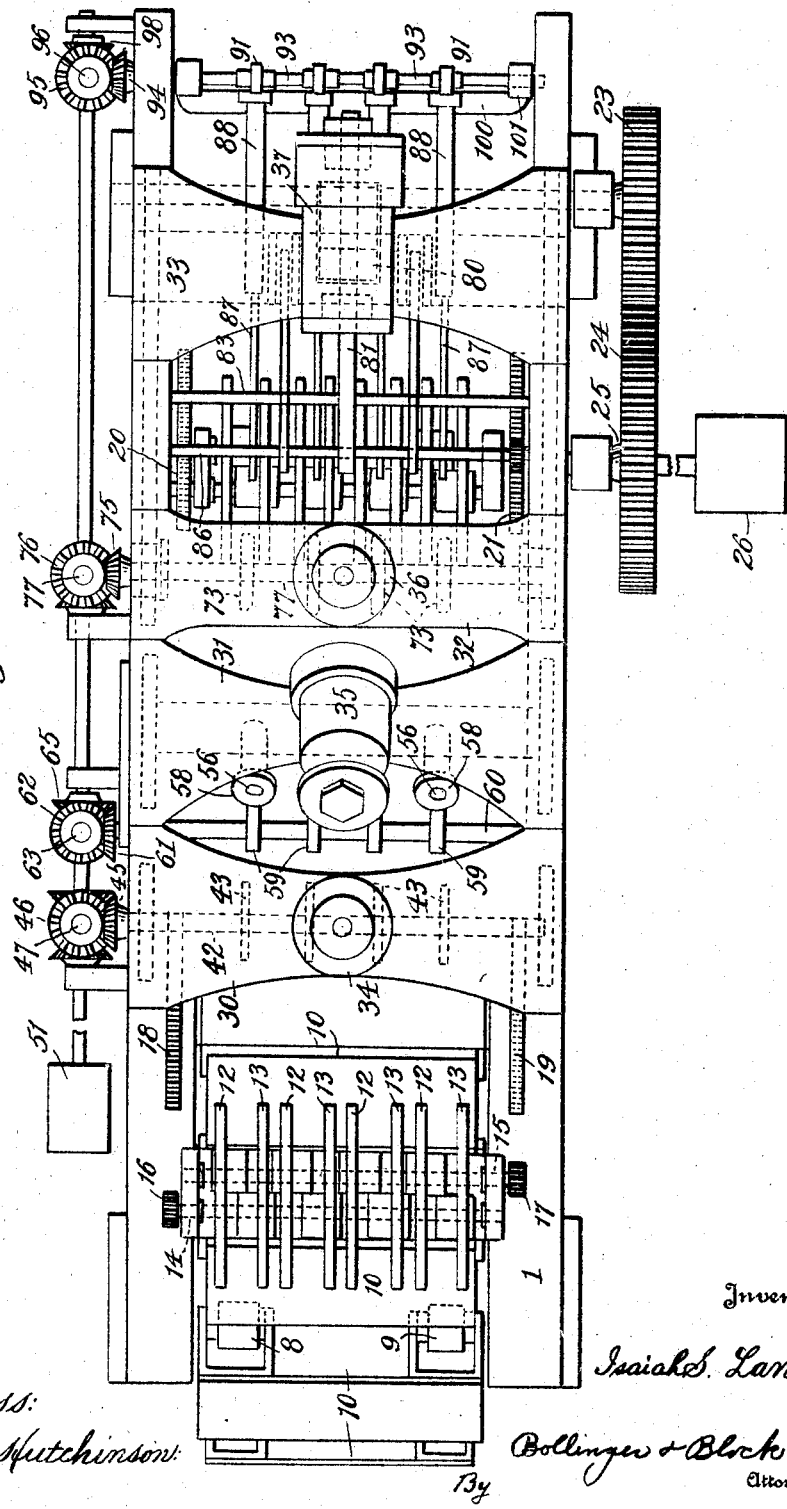
Fig. 1 is a top plan of the machine.

In the drawings 1 indicates the supporting legs of the frame carrying the top or bed plate 2 provided with the transversely spaced longitudinally extending grooves in its upper face as shown more particularly in Fig. 3 of the drawings and for a purpose to be later described. Supported at opposite ends of the frame are the transversely extending horizontal shafts 4 and 5 the shaft 4 carrying the pair of sprocket wheels 6 and the shaft 5 carrying a similar set or pair of sprocket wheels shown at 7. Operating around and carried by the sprocket wheels 6 and 7 are the endless chains 8 and 9 to parallel links of which are connected the transversely extending plates 10 which go forward to make up an endless table or conveyor. Carried by the chains are the rollers 11 which as the table or conveyor passes over the top of the bed 2 will operate in the grooves 3 and engage the bottom surface thereof to support the table or conveyor as more particularly illustrated in Figs. 2 and 3 of the drawings.

Figure 2:
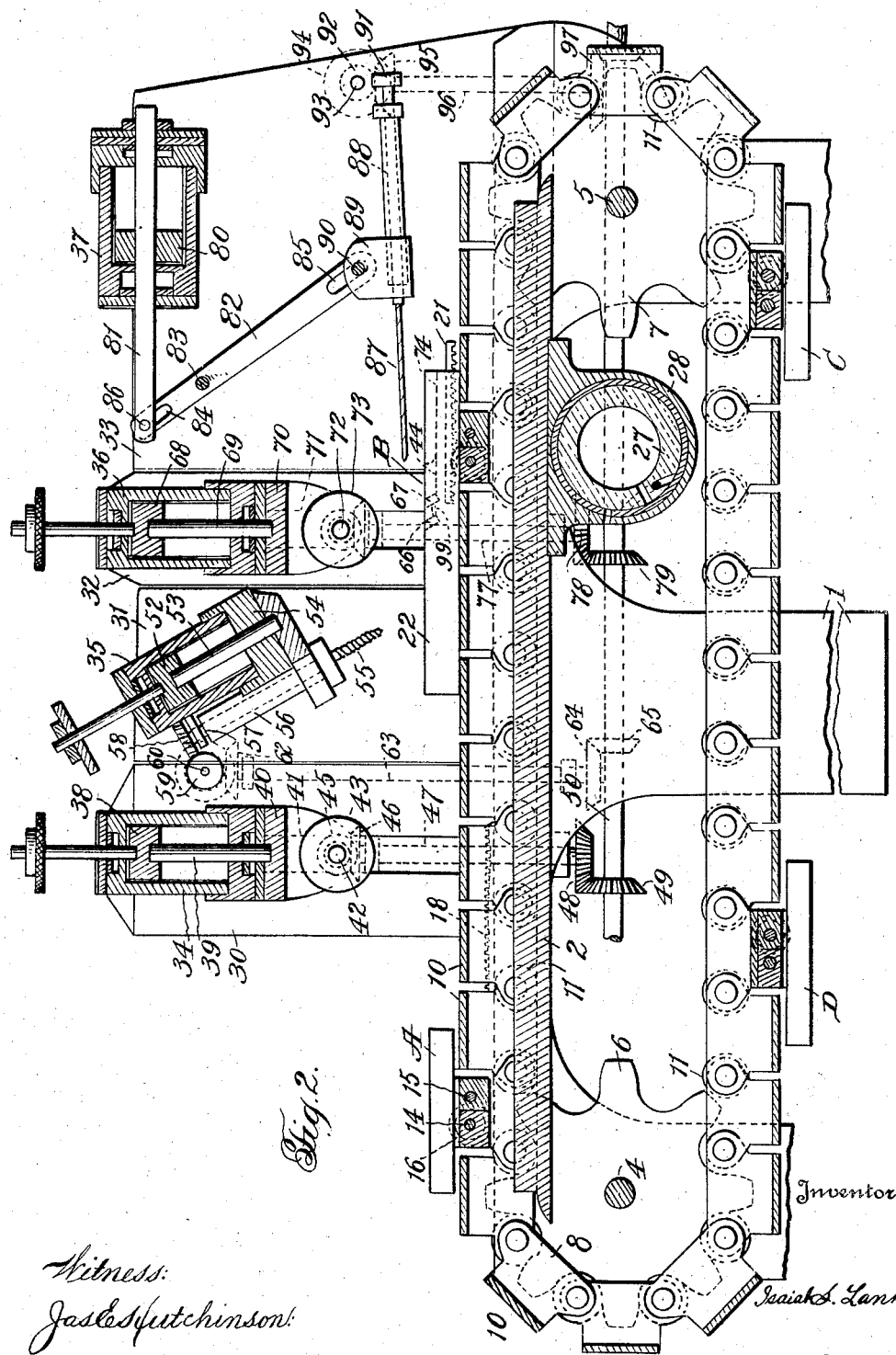
Fig. 2 is a longitudinal vertical section through the machine with parts shown in elevation.
Figure 3:
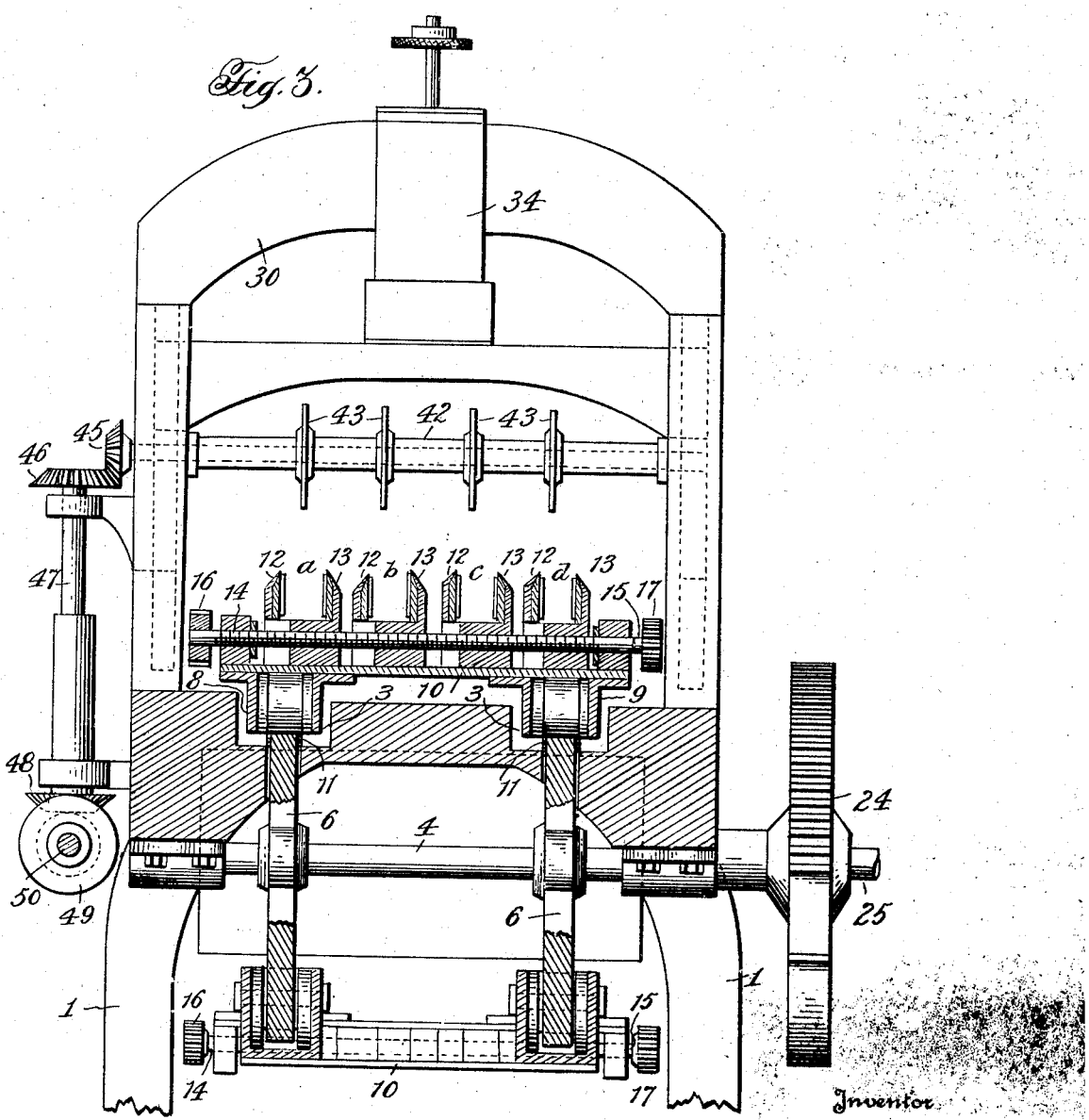
Fig. 3 is a transverse vertical section through the machine with parts shown in elevation.
Figure 4:
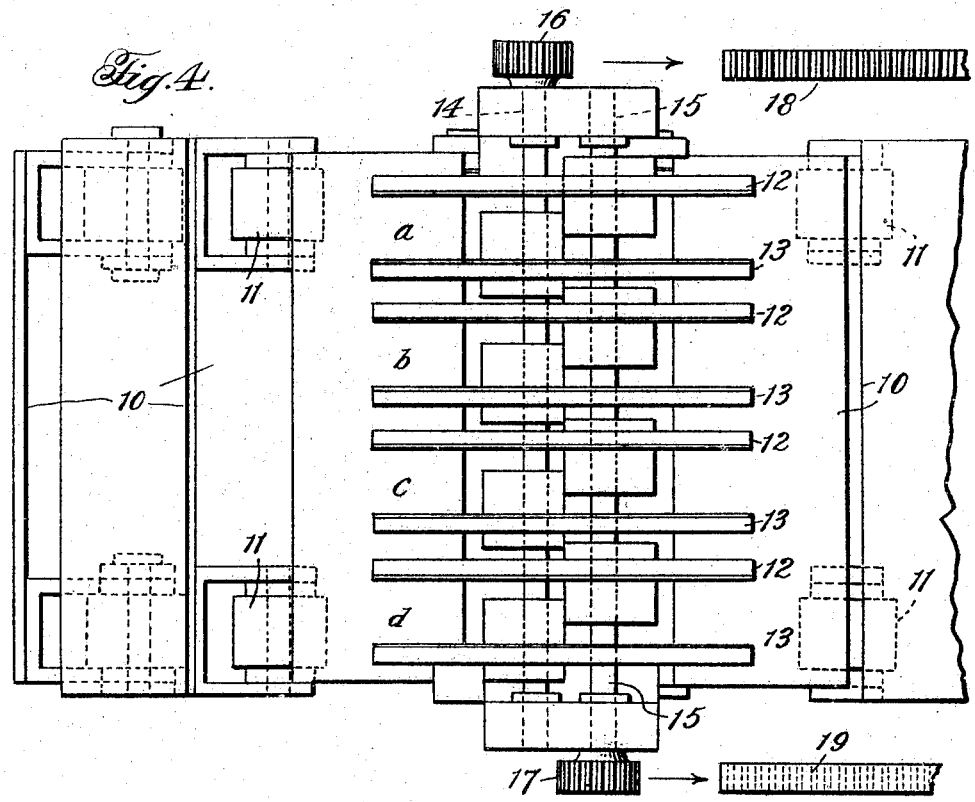
Fig. 4 is a fragmental detail, enlarged, showing in top plan a portion of the endless table or conveyor and one of the groups of vises.

Carried by the endless table or conveyor, at spaced intervals, are the sets of vises indicated generally at A, B, C and D each set including a multiplicity of individual vises as indicated at $a$, $b$, $c$, and $d$ in Fig. 3 of the drawings and spaced transversely of the table or conveyor with the clamping jaws extending longitudinally thereof. Each of the vises includes the clamping jaws 12 and 13, the jaws 13 being operable through means of a threaded rod 14 which extends through the bases thereof and the jaws 12 being operable by means of a screw rod 15 extending through the bases. Secured to one end of the rod 14 is the gear 16 and secured to one end of the rod 15 is the gear 17, the gears being positioned on opposite sides of the table or conveyor as shown more particularly in Figs. 1, 3 and 4 of the drawings for a purpose to be later described. Secured adjacent one end of the bed 2 are the racks 18 and 19 and secured adjacent the opposite end of the bed are the racks 20 and 21, the racks 18 and 20 being in a line to engage the gear wheel 16, and the racks 19 and 21 being in a line to engage the gear wheel 17, when the endless table or conveyor is moved longitudinally of the bed. As illustrated more particularly in Figs. 1 and 4 of the drawings the teeth of the racks 18 and 21 will extend upwardly to engage the under sides of the gear wheels 16 and 17 whereas the teeth of the racks 19 and 20 will extend downwardly to engage the upper surfaces of the gears. It will thus be seen that the racks 18 and 20 and 19 and 21 will rotate the respective gears 16 and 17 in opposite directions as they are engaged therewith. When rotated in one direction the clamping members or jaws 12 of the vises and the clamping members or jaws 13 thereof will be moved towards one another to clamp the material indicated at 22, in Fig. 2 of the drawings, therebetween whereas when they are operated in the other direction they will move the clamping members or jaws away from one another to release the material.

Secured to one end of the horizontal shaft 5 is a mutilated gear 23 which meshes with the mutilated gear 24 carried by the shaft 25 operated through means of an electric motor 26 or other suitable power. As the gear 23 is rotated from the gear 24 it will intermittently operate the table or conveyor and impart a step by step movement thereto to position the material 22 carried thereby to the grooving or boring members. Secured to and operated through means of the shaft 25 carrying the gear 24 is a cylindrical valve 27 which is rotatably mounted in the housing 28 secured to the under side of the bed 2 adjacent one end thereof. Air or other suitable fluid is admitted interiorly to the valve 27 through means of the connection 29 at one end thereof and will be conveyed from the valve in a manner to be later brought out when a detailed description of the valve is given.

Supported by the bed 2 are the arched-shaped standards 30, 31, 32, and 33 the cylinder 34 being supported by the standard 30, the cylinder 35 by the standard 31, the cylinder 36 by the standard 32, and the cylinder 37 by the standard 33. A piston 38 is operable in the cylinder 34 and secured to the piston is the piston rod 39 which extends through the lower end of the cylinder and is connected to the frame 40 which is adapted for sliding movement in the guideways 41 formed in the faces of the standard 30. The frame 40 supports and carries the horizontal shaft 42 to which is secured the transversely spaced grooving discs or cutters 43. In the drawings I have illustrated four of these discs or cutters 43 as being supported by the shaft and they are positioned so that when the frame 40 is lowered they will engage with the material carried by the endless carrier or conveyor for forming the relatively narrow groove 44 in the upper face of the material as shown more particularly in Fig. 10 of the drawings. Secured to one end of the shaft 42 is the beveled gear 45 with which meshes the beveled gear 46 supported upon the upper end of the telescopic shaft 47, a beveled gear 48 being secured to the lower end of the shaft 47 and meshing with the beveled gear 49 secured to the drive shaft 50 which is operable by means of an electric motor 51 or other suitable source of power. The piston 38 is raised and lowered by air admitted to the cylinder on opposite sides of the piston, said air inlet and outlet being controlled through means of the valve 27, previously described, and which will be further later described.

Operable in the cylinder 35 is the piston 52 to which is secured the piston rod 53 which passes through the lower end of the cylinder. Secured to the outer end of the piston rod 53 is the plate 54 which carries four augers or boring tools 55 and the sleeve portions 56 of telescopic shafts, the inner portions of the said telescopic shafts being shown at 57. Secured to the upper end of each of the inner portions of the telescopic shafts is a helical gear 58 which meshes with a gear 59, there being four of these gears 59 mounted upon a horizontal shaft 60 as more particularly illustrated in Fig. 1 of the drawings. Secured to one end of the shaft 60 is a beveled gear 61 which meshes with a beveled gear 62 secured to the upper end of a vertically extending shaft 63, a beveled gear 64 being secured to the lower end of the shaft 63 and meshing with a beveled gear 65 secured to the drive shaft 50 previously described. Air or other fluid is admitted into the cylinder 35, on opposite sides of the piston 52, from the valve 27, in a manner to be later described. The augers or boring tools 55 are used for drilling the diagonally extending recesses 66 and 67 in the upper face of the material 22 as shown more particularly in Figs. 10 and 11 of the drawings, these recesses being longitudinally spaced as shown.

Operable in the cylinder 36 is the piston 68 to which is secured the piston rod 69 which passes through the lower end of the cylinder. Secured to the lower or outer end of the piston rod 69 is the frame 70 which is adapted for vertical sliding movement in the guideways 71 formed in the inner side faces of the standard 32. Carried by the frame 70 is the horizontal shaft 72 to which is secured the transversely spaced grooving discs or cutters 73, four of these discs or cutters being shown. These discs or cutters are of slightly greater width than the cutters 43 carried by the shaft 42 and are adapted for cutting the grooves 74 in the upper faces of the material 22, these grooves 74 being continuations of the grooves 44 and being somewhat wider than said grooves 44 as more particularly illustrated in Fig. 10 of the drawings. Secured to one end of the shaft 72 is the beveled gear 75 which meshes with the beveled gear 76 secured to the upper end of the vertically extending telescopic shaft 77. Secured to the lower end of the shaft 77 is a beveled gear 78 which meshes with and is driven by the beveled gear 79 carried by the drive shaft 50. Air or other fluid is admitted into the cylinder 36 on opposite faces of the piston 68, and controlled by the valve 27, the grooving discs or rollers being lowered into engagement with the material for forming the grooves and then raised after the grooves have been cut to the desired depth and length.

The cylinder 37 which is supported by the standard 33 is arranged horizontally as shown more particularly in Figs. 1 and 2 of the drawings. Operable in the cylinder 37 is the piston 80 to which is secured the piston rod 81. Swinging arms or levers 82 are mounted upon the transversely extending shaft 83 and are formed adjacent their upper end with the elongated opening 84 and adjacent their lower ends with the elongated opening 85. A transversely extending rod 86 is carried by the piston 81, adjacent its outer end, and operates in the elongated openings 84 of the levers or arms 82. Boring or drilling tools are shown at 87 and are carried by the telescopic shafts 88. A yoke or collar 89 is secured to each of the sleeve portions of the telescopic shafts 88 and a shaft 90 connects the lower ends of the arms or levers 82 to said yokes or collars, the rod operating in the elongated openings 85 of said arms or levers. Secured to the end of each telescopic shaft 88, opposite to that carrying the boring or drilling tool 87, is a gear 91 which meshes with the helical gear 92 secured to the horizontally extending shaft 93. Secured to one end of the horizontal shaft 93 is the beveled gear 94 which meshes with the beveled gear 95 secured to the upper end of the vertically extending shaft 96. Secured to the lower end of the shaft 96 is a beleved gear 97 which in turn meshes with the beveled gear 98 carried by the drive shaft 50. The boring tools 97 are adapted for forming the openings 99 in the material 22, these openings being positioned below the upper face of the material and connecting the recesses 66 and 67 as shown more particularly in Figs. 10 and 11 of the drawings. The boring or drilling tools 87 are raised and lowered as the arm or lever 82 is swung by movement of the piston rod 81 and when in its lowermost position will be fed longitudinally with the material to bore the hole. Air or other fluid is admitted into the cylinder 37, on opposite sides of the piston 80, and is controlled by the valve 27 in a manner to be later described. The telescopic shafts 88 are mounted upon the plate 100 which is formed with the eyes 101 through which the shaft 93 passes. The plate 100 is adapted for swinging movement so that the telescopic shafts may be swung or lowered in the manner above described.

Figure 5:
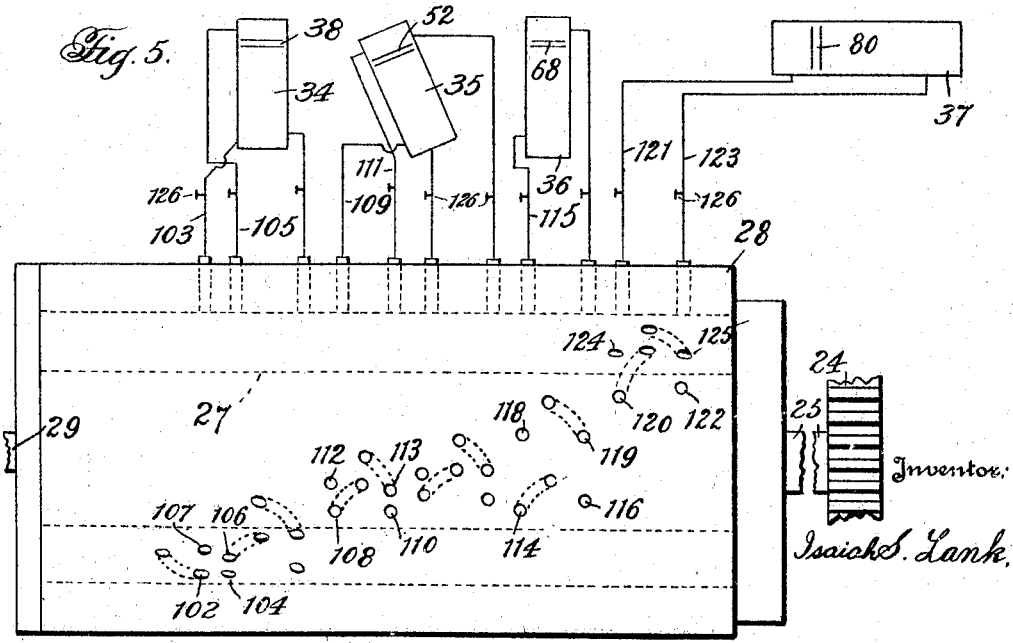
Fig. 5 is a diagrammatic view showing the valve for admitting air into the cylinders which control the grooving and boring members.

I will now endeavor to more clearly bring out the operation of the air controlling valve 27 and in this description will refer more particularly to Fig. 5 of the drawings. Air is admitted into the cylindrical valve through the inlet passage 29 and as the valve is rotated through means of the gear 24 is discharged into or exhausted from the cylinders 34, 35, 36 and 37. The rotatable valve and its housing are provided with the holes as shown and when the hole 102 registers with the pipe 103 and the hole 104 registers with the pipe 105 air will be admitted above the piston 38 in the cylinder 34 and will be exhausted from beneath the piston. A further rotation of the valve brings the hole 106 into registration with the pipe 105 and the hole 107 in registration with the pipe 103, this allowing air to pass into the bottom of the cylinder 34 to raise the piston 38 while air is exhausted from above the piston 38 through the pipe 105 and hole 106. When the hole 108 is brought into registration with the pipe 109 and the hole 110 into registration with the pipe 111 air will be admitted above the piston 52 in the cylinder 35 and exhausted from beneath the piston. A further rotation of the valve will bring the hole 112 into registration with the pipe 109 and the hole 113 in registration with the pipe 111, this allowing air to be admitted to the lower end of the cylinder beneath the piston 52 and exhausted from above the piston. When the hole 114 is brought into registration with the pipe 115 and the hole 116 registered with the pipe 117 air will be admitted to the cylinder 36 above the piston 68 and exhausted from the cylinder from beneath the piston. A further rotation of the valve will bring the hole 118 into registration with the pipe 115 and the hole 119 into registration with the pipe 117, thus allowing air to be admitted adjacent the bottom of the cylinder to raise the piston 68 while the air above the piston is exhausted. When the hole 120 is brought into registration with the pipe 121 and the hole 122 is registered with the pipe 123 air will be admitted through the pipe 123 to the cylinder 37 on one side of the piston 80 while air is exhausted from the opposite side of the piston through the pipe 121. A further rotation of the valve will bring the hole 124 into registration with the pipe 121 and the hole 125 into register with the pipe 123 allowing air to enter the cylinder 37 through the pipe 121 while being exhausted from the cylinder through the pipe 123. By operating the pistons within the cylinders the grooving and boring tools are lowered to be engaged with the material or raised therefrom.

With the parts shown in the positions disclosed in Fig. 2 the necessary grooves and borings have been made in the material 22 and the clamping jaws 12 and 13 of the vises in the set B are being opened by the engagement of the gear wheel 16 with the rack 20 and the engagement of the gear wheel 17 with the rack 21. When the clamping jaws are in open position the material will be removed and taken to the desired place. The clamping jaws of the vises forming the set A, shown in position at the left hand side of the machine, are in open position to receive the material therebetween. As the endless table or conveyor is moved the gears 16 and 17 of this set of vises will be engaged with the racks 18 and 19 respectively to close the clamping jaws 12 and 13 and grip the material therebetween. The material is first positioned beneath the grooving discs 43 and when thus positioned the discs are lowered, as has been previously described, and rotated to cut the groove 44 in the upper surface of the material. When this groove has been cut the discs are again raised and the endless table or conveyor moved to position for the boring tool 55 to drill the recess 67, the boring tool being raised and lowered as has been previously described. With the recess 67 drilled the material is again fed forward a short distance in position so that the boring tool may drill the recess 66 and then the material is positioned so that the grooving discs or cutters 73 may cut the grooves 74 which are, as previously described, somewhat wider than the grooves 44. The next step in the operation is to position the material, by a step by step movement, so that the boring member 87 may cut the substantially horizontal opening 99 connecting the recesses 66 and 67. After this operation the clamping members of the vises are opened so that the material may be removed. It will thus be seen that I have provided a machine which will carry the material, by a step by step movement, into positions to be operated upon, said material being clamped or held against accidental displacement during the boring or grooving operations. It will further be seen that I have provided novel means whereby the jaws of the vises are automatically opened or closed by movement of the endless table or conveyor. While I have illustrated mechanism for holding four strips of the material in line and simultaneously grooving and boring the four strips it will be understood that mechanism might equally as well be provided for varying the number of strips of material held and operated upon by the grooving or boring tools. The air or other fluid which is admitted to the cylinders is automatically controlled through means of the valve 27 by movement of the endless table or conveyor, the table or conveyor being given an intermittent or step by step movement through means of the mutilated or intermittent gears 23 and 24. While the grooves 44 and 74 are being formed the material is being moved forward but is held stationary during the boring operations. The air valve 27 will be continually rotated to properly bring the several parts into proper position and timing.

The machine is primarily intended for cutting grooves and boring the side members in wooden window sashes to carry the sash cord. The sash cord will be positioned in the grooves 44 and 74 and pass through the passages 99, 74 and 44. Knots will be formed in the cord to be received in the recess 67.

The knurled nuts shown on the rods extending upwardly from the pistons 38, 52, 68 and 80 are to be used to check the downward or forward travel of respective pistons and in turn give the required depth in the grooving or boring operation in the material.

All gangs of tools are carried in crosshead guides formed in their respective frame.

Valves shown at 126 are positioned in each of the pipes leading from the valve 27 to the several cylinders so that when desired the admission or exhaust of the air from the several cylinders may be cut off.

Having fully described my invention what I claim as new and desire to secure by Letters Patent is:

1. A machine of the character described including a conveyor, means for intermittently operating the conveyor, means for positioning material upon the conveyor, a plurality of longitudinally spaced cylinders each having a piston operable therein, a tool operable by each of the pistons for operating upon the material, and a continuously rotatable valve successively admitting fluid into the spaced cylinders for operating the pistons.

2. A machine of the character described including a conveyor, a vise carried by the conveyor for positioning material thereon, and means for opening and closing the vise, said means including a threaded rod, a gear carried by said rod, and racks adapted to be engaged by the gear for rotating the rod.

3. A machine of the character described including a conveyor, a vise carried by the conveyor for positioning material thereon, and means for opening and closing the vise, said means including a threaded rod, a gear carried by said rod, and longitudinally spaced racks adapted to be engaged by the gear for rotating the rod.

4. A machine of the character described including a conveyor, a vise carried by the conveyor for positioning material thereon, and means for opening and closing the vise, said means including a threaded rod, a gear carried by said rod, and vertically spaced racks adapted to be engaged by the gear for rotating the rod, one of said racks being positioned to engage the gear at the top and the other at the bottom whereby they will rotate the gear in opposite directions.

5. A machine of the character described including a conveyor, a vise carried by the conveyor for positioning material thereon, and means for opening and closing the vise, said means including a threaded rod, a gear carried by the rod, and longitudinally spaced racks adapted to be engaged by the gear for rotating the same, the racks being positioned on different vertical planes whereby one of them will engage the top of the gear and the other will engage the bottom thereof to rotate the gear in opposite directions.

6. A machine of the character described including a conveyor, a vise, both jaws of which are movable, and means for opening and closing the vise, said means including a pair of threaded shafts, one shaft being adapted to operate one jaw of the vise and the other shaft the other jaw thereof, a gear wheel carried by each of the shafts, and means in the path of the gears for rotating them for moving the jaws through means of the threaded rods.

7. A machine of the character described including a conveyor, a vise carried by the conveyor, both jaws of the vise being movable, a pair of threaded rods, one rod being adapted to operate one jaw of the vise whereas the other rod will operate the other jaw thereof, a gear wheel carried by each of the rods, the gear carried by one rod being on a side of the conveyor opposite to that on which the other gear is positioned, and longitudinally spaced pairs of racks adapted to engage the gears for rotating the same, the racks of each pair being arranged on different vertical planes whereby the gear carried by one rod will be engaged from the bottom and the gear carried by the other rod will be engaged from the top to operate the gears in opposite directions and to move the jaws of the vise towards or away from one another.

8. A machine of the character described including a conveyor, means for intermittently operating the conveyor, means for positioning material upon the conveyor, a plurality of longitudinally spaced cylinders each having a piston operable therein, a tool operable by each of the pistons for operating upon the material, and a continuously rotatable valve, the movement of said valve being timed relative to the movement of the conveyor to successively admit fluid into the spaced cylinders for operating the pistons.

9. A machine of the character described including a conveyer, transversely spaced vises carried by the conveyer, each vise including a pair of jaws extending longitudinally of the conveyer and each jaw being movable, a pair of threaded rods, one rod being adapted to operate one jaw of each pair and the other rod adapted to operate the other jaws of the vises, a gear carried by each rod, and means engageable with the gears for rotating the rods.

10. A machine of the character described including a conveyer, transversely spaced vises carried by the conveyer, each vise including a pair of jaws extending longitudinally of the conveyer and each jaw being movable, a pair of threaded rods extending transversely of the conveyer, one rod being engageable with and adapted to operate one jaw of each vise and the other rod adapted to engage and operate the other jaws of the vises, a gear carried by each rod, and means engageable with the gears for rotating the rods.

In testimony whereof I hereunto affix my signature.

ISAIAH S. LANK.